United States Patent Office 2,734,896
Patented Feb. 14, 1956

2,734,896
METHOD OF EXTRACTING VITAMIN P FROM CITRUS MOLASSES

Boris T. Sokoloff, Lakeland, Fla.

No Drawing. Application October 29, 1952,
Serial No. 317,579

3 Claims. (Cl. 260—210)

The object of this invention is to provide a commercially practicable process for isolating and extracting from citrus molasses, the flavanone and flavone glucosides thereof which are generally known under the name "vitamin P." From the studies made of the vitamin P complex and reported in the extensive literature relating to this vitamin, the latter appears to contain as its essential factors, at least three glucosides belonging to the group of flavanones and flavones, namely, quercitrin, hesperidin and eriodictyol, all of which, or substances closely resembling the same, namely, a quercitrin-like substance, a hesperidin-like substance, and an eriodictyol-like substance, are contained in citrus molasses as well as in the juice of most citrus fruits.

Heretofore, and notwithstanding the large amount of clinical evidence available confirming the therapeutic value of the vitamin P factors present in citrus fruits, attempts to isolate and extract the same from citrus peel have failed to provide this vitamin in any substantial quantity for commercial use, due to the costly procedure involved. I have developed, however, a method for recovering and purifying the three essential factors of this vitamin according to which I use citrus molasses rather than citrus peel as the source; and my method is comparatively much less expensive and moreover does not give rise to the practical difficulties which one encounters in attempting to use citrus peel as a source for large scale production.

Citrus molasses is a by-product of the citrus fruit canning industry. There, the discarded pulp is treated with lime to facilitate the separation of its contained water which, together with its water-soluble substances, is then pressed out from the pulp and recovered as so-called "press-liquor." This liquor is then evaporated in vacuo to a sweet brownish syrup which is known commercially as citrus molasses. I have found that citrus molasses contains all three factors of the vitamin P complex and that their combined potency therein is between 22 and 28 milligrams per gram of the molasses.

In accordance with the method which constitutes my present invention, I add to the molasses a quantity of fuller's earth, or any other absorbent clay, preferably in the proportion of about 130 parts of the clay to 100 parts of the molasses, and thoroughly mix the two. By this step, all three vitamin P factors may be almost wholly, if not completely absorbed by the clay from the molasses. The moisture of this mixture is then reduced by heating the mixture at a temperature of about 100° F., although this temperature may be as low as 70° F. (room temperature) while its upper limit should preferably not exceed 160° F. The residue left will now contain all or substantially all of the vitamin P factors in the molasses treated. Each of the vitamin P factors may now be isolated and recovered individually from said residue in the following manner.

The said residue is first treated with a water immiscible organic solvent such as benzol to isolate and recover its quercitrin-like factor. The benzol extracts therefrom what we may call "fraction A" in which will be contained all or substantially all of the quercitrin-like substance which was originally present in the molasses, but none or substantially none of the other factors of the vitamin. This fraction A after being evaporated, will consist of about 70% of pure quercitrin-like substance which is usable as it is, without purification, for pharmaceutical purposes. But, if desired, this fraction may be further purified by re-extraction with clay or by solvents. Instead of benzol one may use ether, chloroform, petroleum ether or like water immiscible organic solvents for extracting this fraction from the residue aforesaid. As an example of the foregoing, 100 grams of citrus molasses of 78 Brix is thoroughly mixed with 100 grams of fuller's earth and the mixture dried at a temperature of about 100° F. for about 1 hour and extracted with 200 cc. of benzol. After this extraction, the said residue will weigh about 115 grams. By the evaporation of the extract so obtained there will be left about 1.5 grams of a dry material containing about 690 milligrams of quercitrin-like substance per gram of the dry material, according to the Wilson boro-acetate test, with the spectro-curve 415 maxima. To isolate and recover the hesperidin-like factor of the vitamin, the said 115 gram residue left after the extraction with benzol is re-dried and then extracted with acetone, methyl acetate or other like water miscible organic solvent. This extraction gives what we may call "fraction B" which contains exclusively, or almost exclusively, a methyl-chalcone, that is, water-soluble derivatives of hesperidin. When this fraction B is evaporated and dried, it will contain between 15 and 40% of a pure water-soluble form of hesperidin, an indicated by the boro-acetate test and alkali boiling; and this dried fraction may be used as it is, without purification, for pharmaceutical purposes. But, if desired, this fraction may be re-purified by re-extraction with clay. Referring to the example above given, in which 100 grams of citrus molasses of 78 Brix are mixed with 100 grams of fuller's earth, then dried and extracted with 200 cc. of benzol, the 115-gram residue left after the benzol extraction (fraction A) is now dried until its weight is reduced to about 98 grams, and then extracted with 200 cc. of acetone, and the acetone extract (fraction B) evaporated and dried. This second extract, when evaporated and dried, will weigh about 3.8 grams and contain about 23% of pure methyl-chalcone, water-soluble derivatives of hesperidin. To isolate and recover the eriodictyol-like substance of the vitamin, the residue left after the extraction with acetone is again dried and then extracted with isopropyl alcohol, methanol, ethyl alcohol, or like lower aliphatic alcohol solvent. The third extract thus obtained, which we may refer to as "fraction C," contains neither a quercitrin-like substance nor a water-soluble form of hesperidin, but exhibits a typical spectro-curve of eriodictyol with maxima about 375. Referring again to the example above given, the residue left after the acetone extraction (fraction B) and which should weight about 112 grams is dried until its weight is reduced to about 96 grams and then extracted with 150 cc. of isopropyl alcohol. This alcoholic extract when evaporated and dried will weigh about 2.9 grams and contain about 31% of pure eriodictyol-like material.

In commercial production, my method may be simplified by extracting the aforesaid fractions B and C together; but the procedure described above serves the purpose of isolating and recovering separately each of the three factors of vitamin P present in citrus molasses.

In practice, when my method is applied to large scale production, about 50 pounds of pure or almost pure vitamin P factors may be extracted from a ton of citrus molasses.

I claim as my invention:
1. A method for isolating and recovering the quer- citrin-like substance contained in citrus molasses, which method comprises adding to and mixing with the molasses a quantity of fuller's earth, reducing the moisture of the resulting mixture to obtain a substantially dry residue, and treating said residue with benzol to extract substantially all the quercitrin-like substance contained in the original molasses.

2. A method for isolating and recovering the quercitrin-like substance and the hesperidin-like substance contained in citrus molasses, which method comprises adding to and mixing with the molasses a quantity of an absorbent clay, reducing the moisture of the resulting mixture to obtain a substantially dry residue, treating said residue with benzol to extract substantially all the quercitrin-like substance contained in the original molasses, re-drying said residue and treating the re-dried residue with acetone to extract substantially all the hesperidin-like substance contained in the original molasses.

3. A method for isolating and recovering each of the three factors of the vitamin P complex contained in citrus molasses, which method comprises adding to and mixing with the molasses a quantity of an absorbent clay, reducing the moisture of the resulting mixture to obtain a substantially dry residue, treating said residue with benzol to extract substantially all the quercitrin-like substance contained in the original molasses, re-drying said residue, treating the re-dried residue with acetone to extract substantially all the hesperidin-like substance contained in the original molasses, again re-drying the residue, and treating the latter with isopropyl alcohol solvent to extract substantially all the eriodictyol-like substance contained in the original molasses.

References Cited in the file of this patent

UNITED STATES PATENTS

| | | |
|---|---|---|
| 2,520,127 | Couch et al. | Aug. 29, 1950 |
| 2,557,164 | Wender | June 19, 1951 |
| 2,587,600 | Couch et al. | Mar. 4, 1952 |

OTHER REFERENCES

Bruckner et al.: Nature, page 1057, December 19, 1936.